(12) United States Patent
Takasu et al.

(10) Patent No.: US 6,441,836 B1
(45) Date of Patent: Aug. 27, 2002

(54) DISPLAY APPARATUS AND DISPLAY CONTROL METHOD OF DISPLAYING DATA TOGETHER WITH ICON REPRESENTING CONTENTS OF DATA

(75) Inventors: Akihide Takasu, Akishima; Shoji Matsuo, Hamura, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/324,187

(22) Filed: Jun. 2, 1999

(30) Foreign Application Priority Data

Jun. 5, 1998 (JP) .......................................... 10-157657

(51) Int. Cl.[7] ............................................... G06F 3/00
(52) U.S. Cl. ...................... 345/835; 345/839; 345/810; 345/968; 709/201
(58) Field of Search ............................... 345/835, 839, 345/968, 765, 837, 840, 846; 707/104.1, 3, 10; 709/201

(56) References Cited

U.S. PATENT DOCUMENTS 5,572,233 A    11/1996  Kakegawa ................. 345/835
5,778,382 A  * 7/1998  Hatori ........................... 707/1
6,020,828 A  * 2/2000  Gotou ........................ 340/7.56
6,161,026 A  * 12/2000 Uchida ........................ 455/566
6,256,520 B1 * 7/2001  Suzuki ........................ 455/572

FOREIGN PATENT DOCUMENTS

EP          0 358 301        3/1990

* cited by examiner

*Primary Examiner*—John Cabeca
*Assistant Examiner*—Kieu D. Vu
(74) *Attorney, Agent, or Firm*—Frishauf, Holtz, Goodman & Chick, P.C.

(57) ABSTRACT

A plurality of icon data and keywords respectively corresponding to the icon data are stored in an icon data storage section. Matching between the data input by the data input section and a keyword stored in the icon data storage section is detected. Icon data stored in the icon data storage section in correspondence with a keyword which is detected to match the data input by the data input section is added to the input data, and the obtained data is displayed.

18 Claims, 13 Drawing Sheets

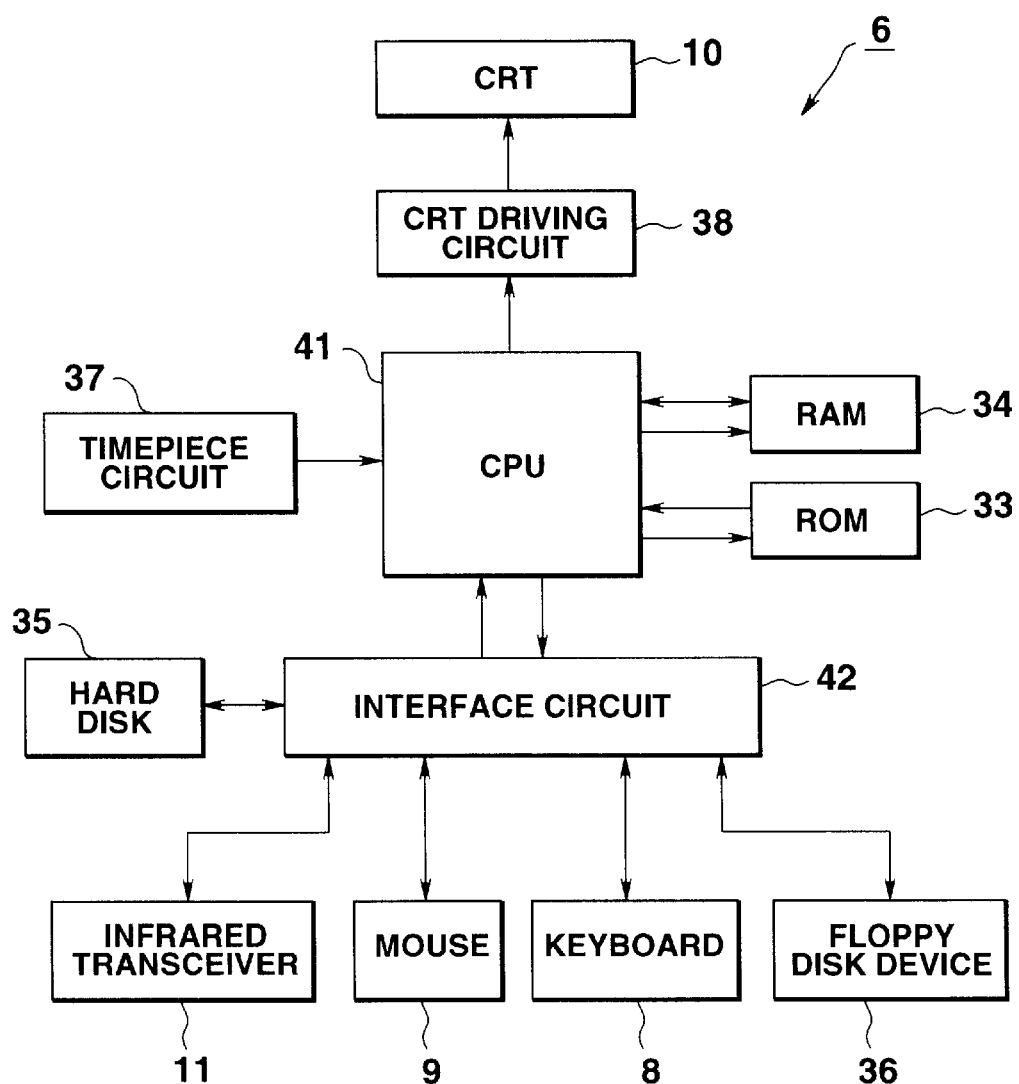

FIG.4

| CATEGORY | KEYWORD | ICON | 33a |
|---|---|---|---|
| 1 | PARTY DINNER FEAST BANQUET |  | X1 |
| 2 | MEETING CONFERENCE COUNCIL |  | X2 } X |
| 3 | FISHING ANGLING BASS CARP |  | X3 |
| 4 | DRIVE, CAR |  | |

FIG.5

(KEYWORD IS STORED AS ICON CODE)

| DATA/TIME | ICON | IDENTIFICATION | SCHEDULE CONTENTS | |
|---|---|---|---|---|
| 1998.5.11(MON) 18:00~20:00 |  | INTERNAL | FAREWELL PARTY | |
| 1998.5.13(WED) 15:00~16:00 |  | LINK | MEETING (THE CURTAILMENT OF THE EXPENSE) | 34a |
| 1998.5.16(SAT) 18:00~26:00 |  | LINK | BASS FISHING KAWAGUCHI LAKE Mr. YAMAMOTO Mr. SUZUKI Mr. YAMADA | |
| 1998.5.17(SUN) 6:00~17:00 |  | INTERNAL | DRIVE YAMANAKA LAKE | |

| NAME | TEL NO. | FAX NO. | ADDRESS | |
|---|---|---|---|---|
| TARO YAMADA | 03-1111-2222 | 03-5432-5678 | CHIYODA-KU, TOKYO | |
| AKIRA SUZUKI | 03-3333-4444 | | SHINJUKU-KU, TOKYO | 34b |
| TADASHI YAMAMOTO | 03-1234-5678 | 03-1234-5678 | SUGINAMI-KU, TOKYO | |

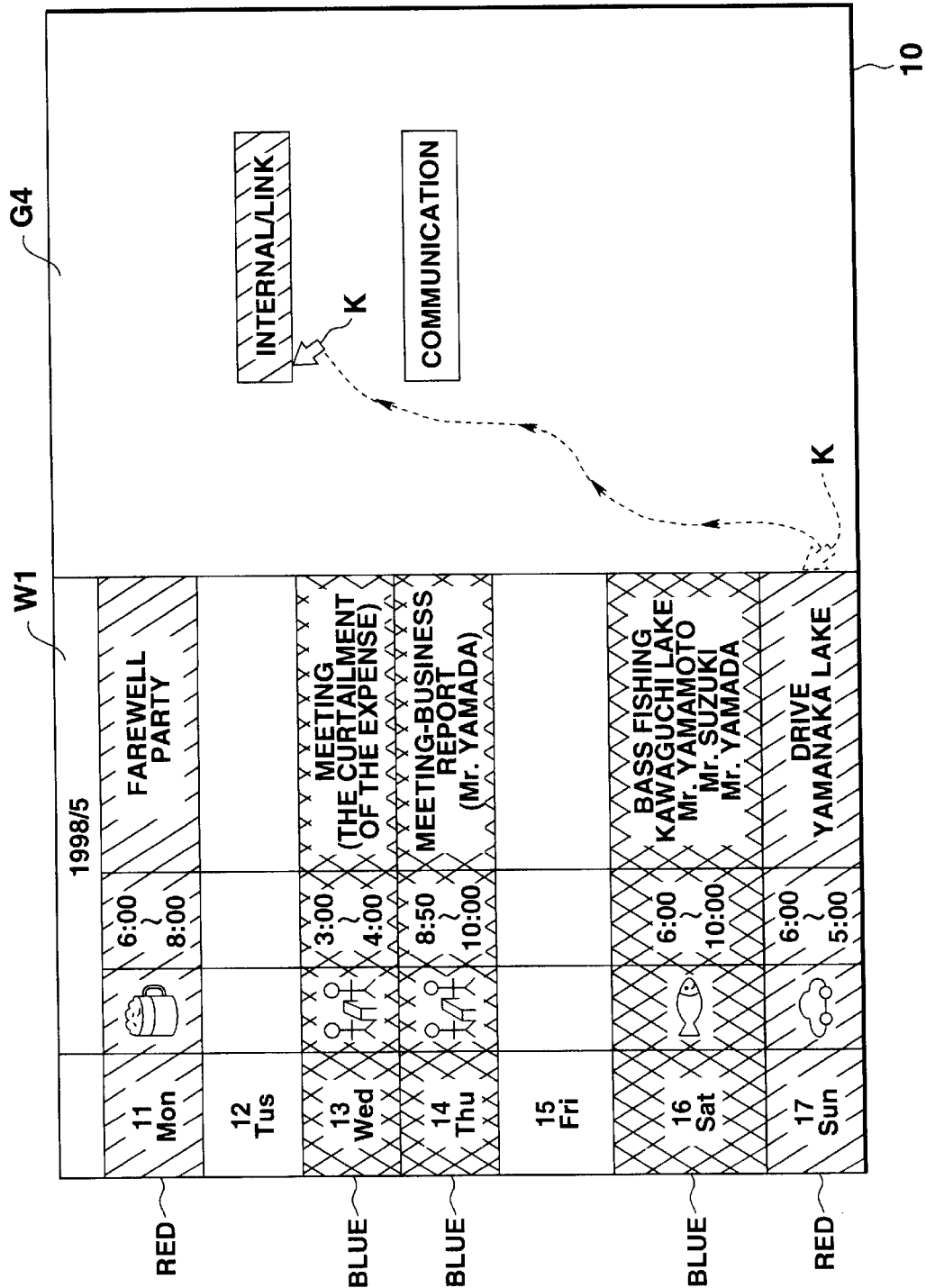

TIME DISPLAY MODE

SCHEDULE DISPLAY MODE

TIME DISPLAY MODE

SCHEDULE DISPLAY MODE

DISPLAY APPARATUS AND DISPLAY CONTROL METHOD OF DISPLAYING DATA TOGETHER WITH ICON REPRESENTING CONTENTS OF DATA

BACKGROUND OF THE INVENTION

The present invention relates to a display apparatus and display control method of displaying input data together with an icon representing the contents of the data.

Generally, an electronic information device capable of storing personal information containing arbitrary input data and managing it, e.g., a personal computer or electronic notebook, receives schedule data, address book data, telephone directory data, and the like, searches the data for desired data, and displays the found data as needed.

For example, each schedule data is a combination of a date, time, and contents. The schedule data are sorted and stored in chronological order from the current time, and desired data is retrieved and displayed.

However, in a conventional electronic information device which only sorts a number of schedule data in the order of date and time, searches the data, and displays retrieved data, the specific contents of each schedule data must be confirmed only by reading, e.g., the headline of the data. For this reason, it is very cumbersome to confirm the date and time of a specific schedule.

In devices disclosed in E.P. No. 358301 and U.S. Pat. No. 5,572,233, one of a plurality of icons is selected in correspondence with schedule data, and the selected icon is displayed together with the schedule data. However, it is tedious for the user to select an optimum icon from a plurality of icons in accordance with the contents of schedule data.

BRIEF SUMMARY OF THE INVENTION

It is an object of the present invention to provide a display apparatus and display control method capable of automatically assigning an icon to data in accordance with the contents of the data to allow a user to recognize the contents of the data at a glance.

In order to achieve the above object, according to an aspect of the present invention, there is provided a display apparatus for displaying data together with an icon representing contents of the data, comprising a data input section for inputting data, an icon data storage section which stores a plurality of icon data and keywords respectively corresponding to the icon data, a keyword detection section which detects matching between the data input by the data input section and a keyword stored in the icon data storage section, and a display control section which adds, to the input data, icon data stored in the icon data storage section in correspondence with a keyword which is detected by the keyword detection section to match the data input by the data input section, and for displaying the obtained data.

According to the above arrangement, matching between input data and a keyword stored in an icon data storage section is detected. Icon data stored in the icon data storage section in correspondence with the keyword detected to match the input data is added to the input data and displayed. Hence, an icon appropriate to data contents can be automatically added to the data, so the data can be displayed to allow the user to recognize the contents at a glance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing the arrangement of the electronic circuit of a personal computer shown in FIG. 1;

FIG. 4 is a view showing the data storage state of an icon data memory incorporated in the ROM of the personal computer shown in FIG. 1;

FIG. 5 is a view showing the storage states of a schedule data memory and address data memory allocated in the ROM of the personal computer shown in FIG. 1;

FIG. 12 is a view showing a schedule communication screen displayed when setting between internal data and link data is changed in schedule communication processing of the personal computer shown in FIG. 1;

DETAILED DESCRIPTION OF THE INVENTION

An embodiment of the present invention will be described below with reference to the accompanying drawing.

Figure 1:
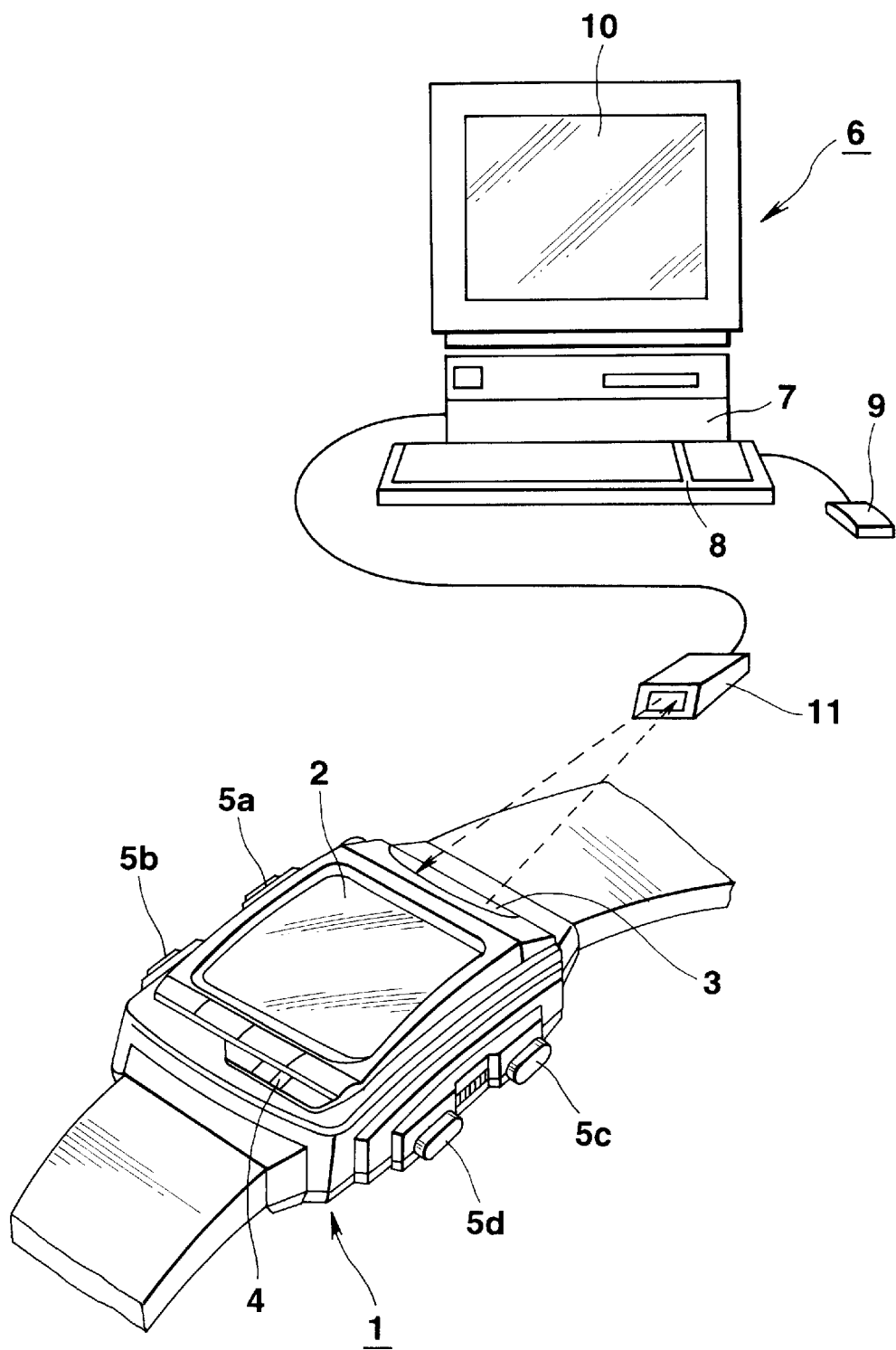
FIG. 1 is a view showing the outer appearance of a data communication system constructed by combining a watch having a display apparatus according to an embodiment of the present invention and a personal computer.

FIG. 1 is a view showing the outer appearance of a data communication system that combines a watch apparatus having a display apparatus according to an embodiment of the present invention and a personal computer.

A watch apparatus 1 as a wrist electronic device has a band worn on, e.g., an arm of a user. The watch apparatus 1 also has a display section 2 formed from a liquid crystal display in the center of the front surface, a transceiver section 3 at the upper portion of the front surface, a loudspeaker 4 for generating an electronic sound at a lower portion of the front surface, and four keys 5a to 5d for mode switching, time setting, data input, and data search on the left and right side surfaces.

The key 5a is a mode switching key used for switching between a timepiece mode for displaying the current time and a notebook mode for searching schedule data or address book data and displaying retrieved data. The key 5b functions as a data input key used for selecting and inputting various data. The key 5c functions as a search key used for searching various data and displaying desired data. The key 5d functions as an end key used for ending the notebook mode.

A personal computer 6 comprises a computer main body 7, a keyboard 8, a mouse 9, a CRT display section 10, and an infrared transceiver 11. The personal computer 6 can transmit/receive data to/from the transceiver section 3 of the watch apparatus 1 through the infrared transceiver 11.

The personal computer 6 has various functions such as a communication processing function of performing data communication with the watch apparatus 1, a schedule processing function of inputting, registering, searching, and displaying schedule data, an address processing function of inputting, registering, searching, and displaying address book data, and a game processing function of playing a game. For, e.g., the communication processing function, a full data communication mode for performing data communication with the watch apparatus 1 for all data including schedule data and address book data, a schedule communication mode for performing data communication with the watch apparatus 1 for only schedule data, and an address communication mode for performing data communication with the watch apparatus 1 for only address book data are prepared.

In each data communication mode, upon synchronization with the watch apparatus 1, whether to process each data as internal data which is stored and managed in only the personal computer 6 or as link data which is commonly stored and managed in both the personal computer 6 and watch apparatus 1, can be set.

Each schedule data is stored and managed together with an icon corresponding to a keyword contained in the schedule data, thereby indicating the schedule contents. In this case, character string data within the range of the keyword of the schedule data is stored and managed not as sequence data of character codes but as data of one icon code corresponding to the keyword. With this arrangement, the data quantity can be reduced.

Figure 2:
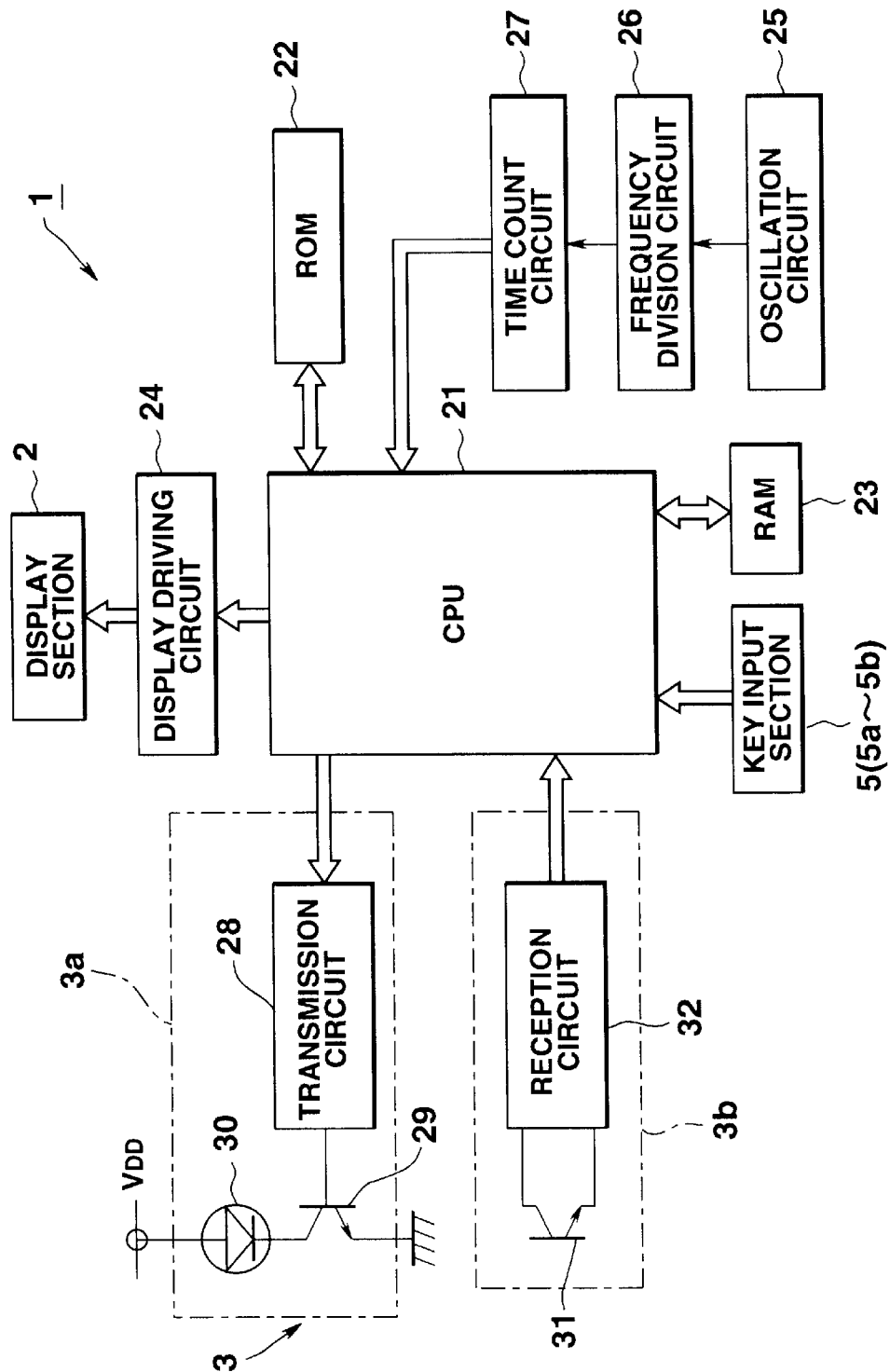
FIG. 2 is a block diagram showing the arrangement of the electronic circuit of the watch shown in FIG. 1.

FIG. 2 is a block diagram showing the arrangement of the electronic circuit of the watch apparatus.

The watch apparatus 1 has a control section (CPU) 21 as a computer.

The control section (CPU) 21 is connected not only to the transceiver section 3 and a key input section 5 comprising the keys 5a to 5d but also to a ROM 22, a RAM 23, and a display driving circuit 24 for driving the display section 2. An oscillation signal having a predetermined period and output from an oscillation circuit 25 is frequency-divided by a frequency division circuit 26 and supplied to the CPU 21 through a time count circuit 27 as a time count signal.

The transceiver section 3 comprises a transmitter section 3a and a receiver section 3b. The transmitter section 3a has a transmission circuit 28, a switching transistor 29, and an infrared light-emitting diode 30. The receiver section 3b has an infrared phototransistor 31, and a reception circuit 32.

Transmission data supplied from the control section (CPU) 21 to the transmitter section 3a is modulated by an infrared signal using the transmission circuit 28, emitted by the infrared light-emitting diode 30, and transmitted. A data signal received by the infrared phototransistor 31 of the receiver section 3b is demodulated by the reception circuit 32 and supplied to the control section (CPU) 21.

The ROM 22 stores a system program for controlling the entire operation of the electronic circuit of the watch apparatus 1. The ROM 22 also stores in advance a time count processing program for updating and displaying date, day of the week, and time on the basis of a time count signal from the time count circuit 27, a notebook processing program for inputting, storing, searching, and displaying data in the notebook mode, and a communication processing program for performing data communication with the external personal computer 6 through the transceiver section 3.

FIG. 3 is a block diagram showing the arrangement of the electronic circuit of the personal computer.

The personal computer 6 has a control section (CPU) 41 as a computer.

The control section (CPU) 41 starts a system program stored in advance in a ROM 33 or a program loaded from a hard disk device 35 or a floppy disk device 36 in accordance with key input data, mouse click data, or communication data input through an interface circuit 42, and controls the operation of the respective portions of the circuit in accordance with the program data using the RAM 34 as a work memory. The control section (CPU) 41 is connected not only to the interface circuit 42, ROM 33, and RAM 34 but also to a CRT driving circuit 38 for driving the color CRT display section 10.

The interface circuit 42 is connected to the keyboard 8, mouse 9, and infrared transceiver 11, and also to the hard disk device 35 and floppy disk device 36.

The ROM 33 stores a system program for controlling the entire operation of the electronic circuit of the personal computer 6. The ROM 33 also stores programs for executing various functions, including a communication processing program for performing data communication with the watch apparatus 1, a schedule processing program for inputting, registering, searching, and displaying schedule data, an address processing program for inputting, registering, searching, and displaying address book data, and a game processing program for playing a game.

The communication processing program comprises three subprograms corresponding to different communication data, i.e., a full data communication processing program for performing data communication with the watch apparatus 1 for all data including schedule data and address book data, a schedule communication processing program for performing data communication with the watch apparatus 1 for only schedule data, and an address communication processing program for performing data communication with the watch apparatus 1 for only address book data.

The ROM 33 also has an icon data memory 33a.

FIG. 4 is a view showing the data storage state of the icon data memory 33a incorporated in the ROM 33 of the personal computer 6.

The icon data memory 33a stores keywords belonging to various categories in correspondence with icons X representing the meanings of the keywords. As keyword data corresponding to each icon X, all words associated with the icon X are stored as character data with full transcription.

For example, as "keywords" corresponding to an "icon X2" representing two persons facing each other via a table, "MEETING, CONFERENCE, COUNCIL" are stored.

Schedule data or address book data input by keys upon starting the schedule processing program or address processing program is stored in a schedule data memory 34*a* or an address data memory 34*b* in the RAM 34.

FIG. 5 is a view showing the data storage states of the schedule data memory 34*a* and address data memory 34*b* allocated in the ROM 34 of the personal computer 6.

In the schedule data memory 34*a*, icon data derived from a keyword contained in schedule contents in accordance with data stored in the icon data memory 33*a* is stored in correspondence with the date, time, and schedule contents, and also identification data representing whether the schedule data is internal data stored and managed in only the personal computer 6 or link data commonly stored and managed in both the personal computer 6 and watch apparatus 1 is set and stored.

Character string data within the range of a keyword (with an underline) in the content data portion of the schedule is stored and managed not as sequence data of character codes but as data of one icon code corresponding to the keyword. With this arrangement, the data quantity can be reduced.

The operation of the data communication system constructed by the watch apparatus having the display control apparatus with the above arrangement and personal computer will be described next.

Figure 6:
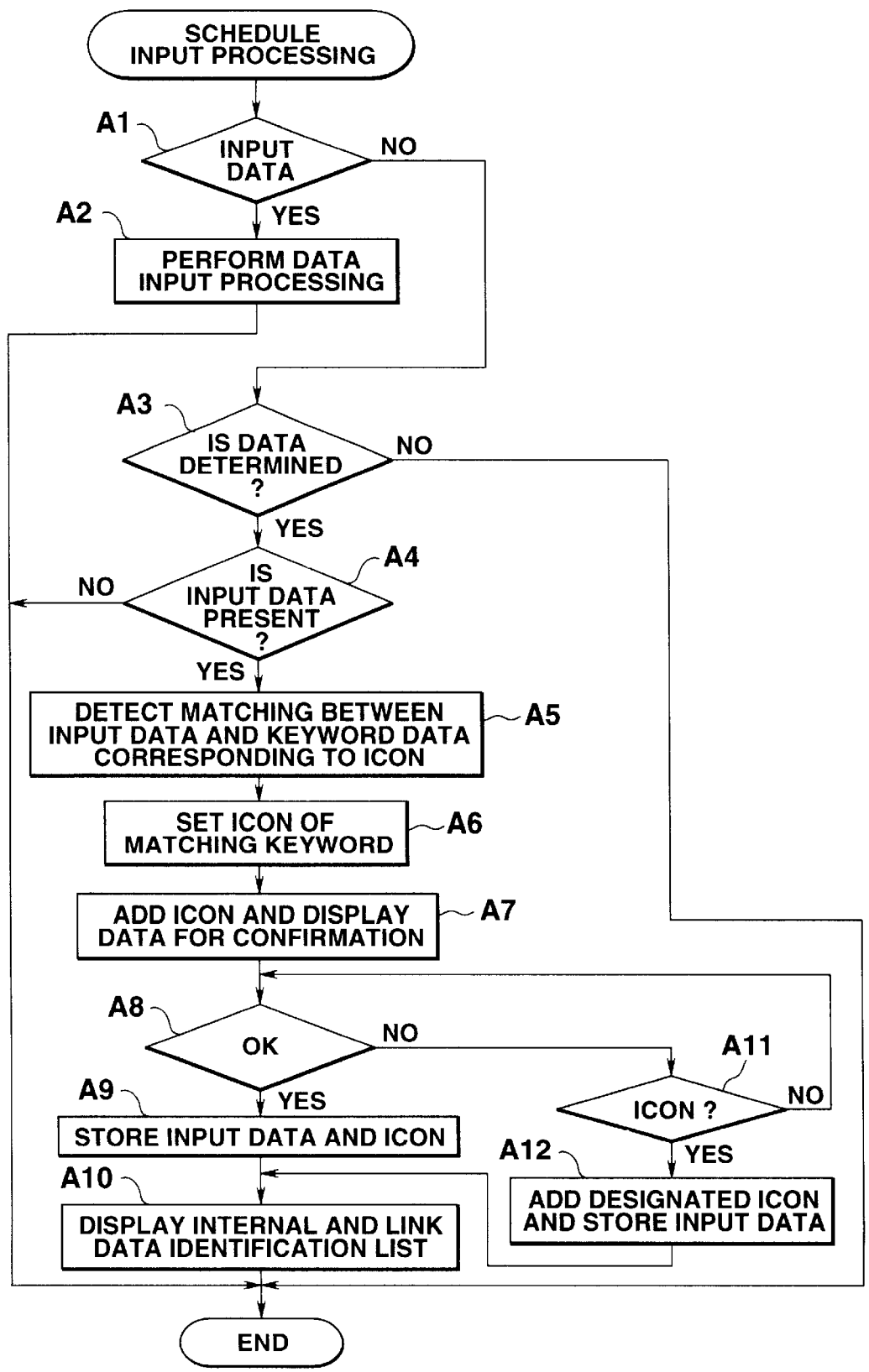
FIG. 6 is a flow chart showing schedule input processing of the personal computer shown in FIG. 1.

FIG. 6 is a flow chart showing schedule input processing of the personal computer 6.

Figure 7:
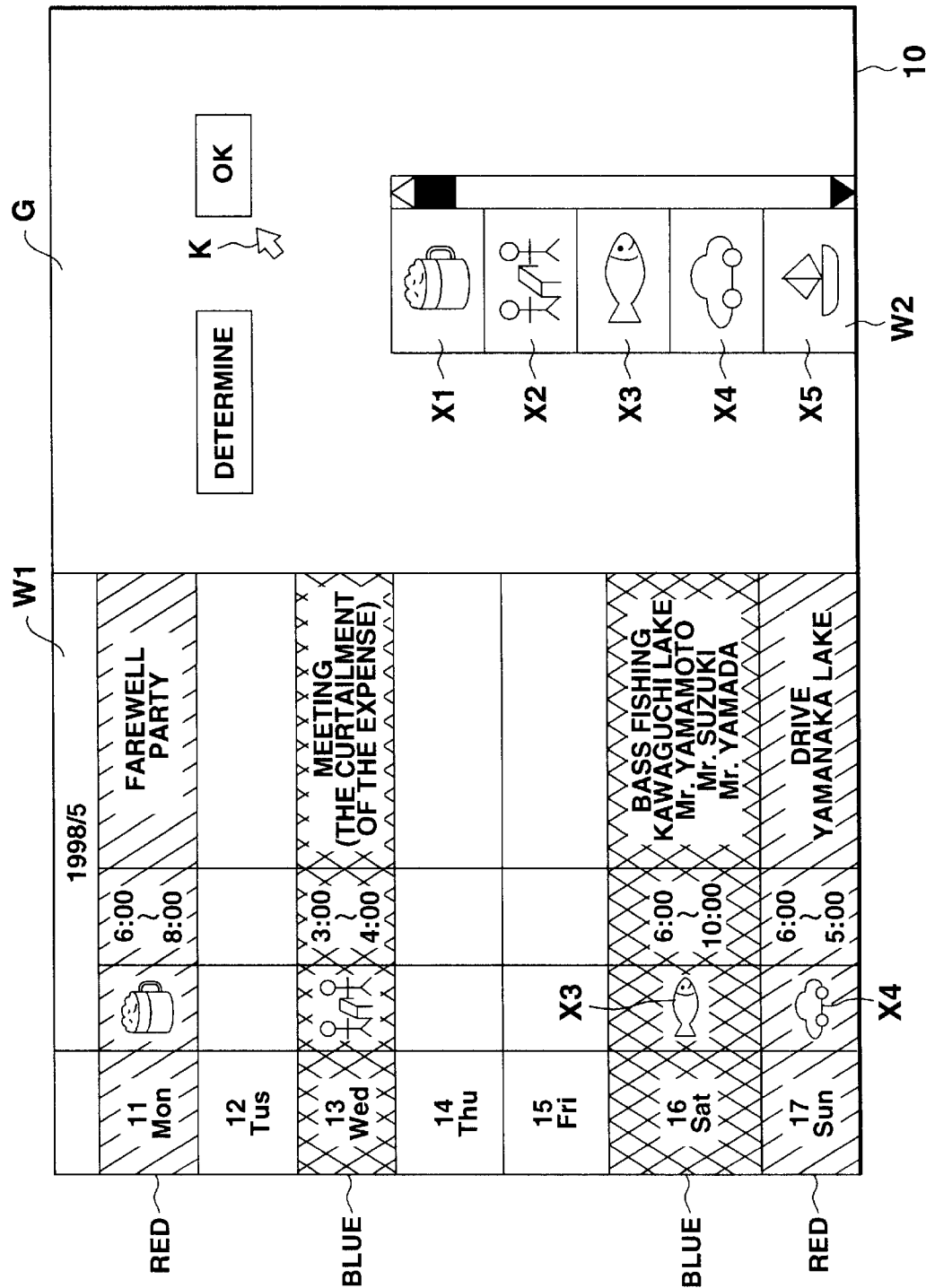
FIG. 7 is a view showing an input screen displayed in schedule input processing in the personal computer shown in FIG. 1.

FIG. 7 is a view showing a schedule input screen G displayed in schedule input processing of the personal computer 6.

Figure 9A:
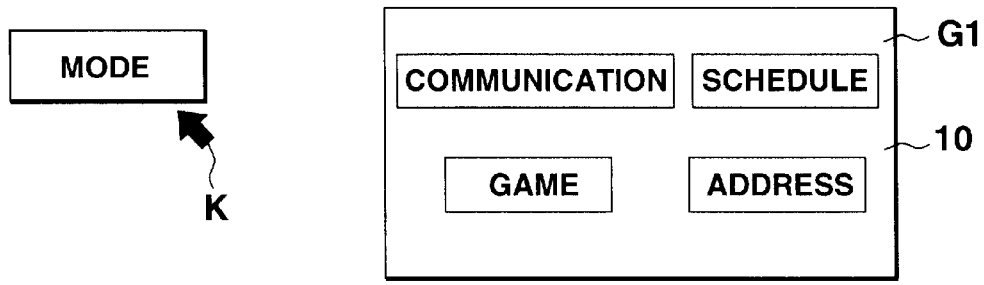
FIGS. 9A to 9D are views showing screens displayed when the communication processing mode of the personal computer shown in FIG. 1 is switched to a schedule communication mode.

In the initial menu display screen of the personal computer 6, when a "mode" key on the display screen is pointed by a mouse cursor K and clicked, a mode selection screen G1 [FIG. 9A] for selecting one of the communication processing mode, schedule processing mode, address processing mode, and game processing mode and starting it is displayed on the CRT display section 10.

When the "schedule" key on the mode selection screen G1 is selected by the mouse cursor K and clicked, schedule input processing shown in FIG. 6 is started, and the schedule input screen G is displayed on the CRT display section 10.

On this schedule input screen G, a schedule list window WI for displaying a list of schedule data already stored in the schedule data memory 34*a* in the RAM 34 and schedule data newly input by this schedule input processing is opened together with an icon selection window W2 for selecting an arbitrary icon and adding it in correspondence with input schedule data.

On the schedule list window W1, schedule data set as internal data in the schedule data memory 34*a* is identified and displayed in red, and schedule data set as link data is identified and displayed in blue. In the time and content columns for each date on the schedule list window W1, data for daytime is set and displayed on the upper half of the column, and data for night is set and displayed on the lower half.

For example, the "time column" corresponding to "17/Sun" of 1998/5 on the schedule list window W1 is pointed by the cursor K, "6:00–17:00" is input by operating the keyboard 8, the "content column" is pointed by the cursor K, and "DRIVE YAMANAKA LAKE" is input by operating the keyboard 8. Of the input time data "6:00–17:00", the latter "17:00" is converted into data for night, "5:00". These time data are displayed across the upper- and lower-half areas of the time column as "6:00–5:00". The input content data "DRIVE YAMANAKA LAKE" is displayed in the upper-half area of the content column (steps A1 and A2).

When "determine" key is pointed by the cursor K and clicked, it is determined that input data is present. All keyword data for each category, which are stored in the icon data memory 33*a* (FIG. 4) in the ROM 33, are sequentially read out in correspondence with the content data "DRIVE YAMANAKA LAKE" of the input data, and matching/mismatching between the data is detected. In this case, keyword "DRIVE" is detected as a match, and "car icon data X4" stored in correspondence with this keyword is set (steps A3, A4, A5, and A6).

The car icon data X4 found on the basis of the keyword in correspondence with the input schedule contents is added to the "icon column" on the schedule list window W1 and displayed for confirmation (step A7).

When the "OK" key is pointed by the cursor K and clicked, the icon data X retrieved, set, and added on the basis of the keyword is stored in the schedule data memory 34*a* in the RAM 34 together with the date and content data of the schedule input and displayed on the schedule list window W1 (steps A8 and A9). The character string data "DRIVE" in the character string data "DRIVE YAMANAKA LAKE" stored in the schedule data memory 34*a* as content data, which is detected to match the keyword, is not stored as character code data but replaced with code data of the car icon X4 detected as a match, and stored. On the schedule list window W1, the code data is replaced with the keyword and displayed.

The identification data of the newly input schedule data is set as internal data and stored. On the schedule list window W1, the schedule data is identified and displayed in red (step A10).

Alternatively, when an icon corresponding to a keyword of contents of arbitrary input schedule data is detected, added, and displayed on the schedule list window W1 for confirmation (step A7), another arbitrary icon appropriate for the input schedule is selected from a number of icons displayed on the icon selection window W2 and designated by the cursor K and clicked in place of the icon automatically detected and added in correspondence with the keyword. In this case, the icon data designated on the icon selection window W2 is stored in the schedule data memory 34*a* in the RAM 34 together with the date and content data of the schedule input and displayed on the schedule list window W1 (step A11 and A12).

Figure 8:
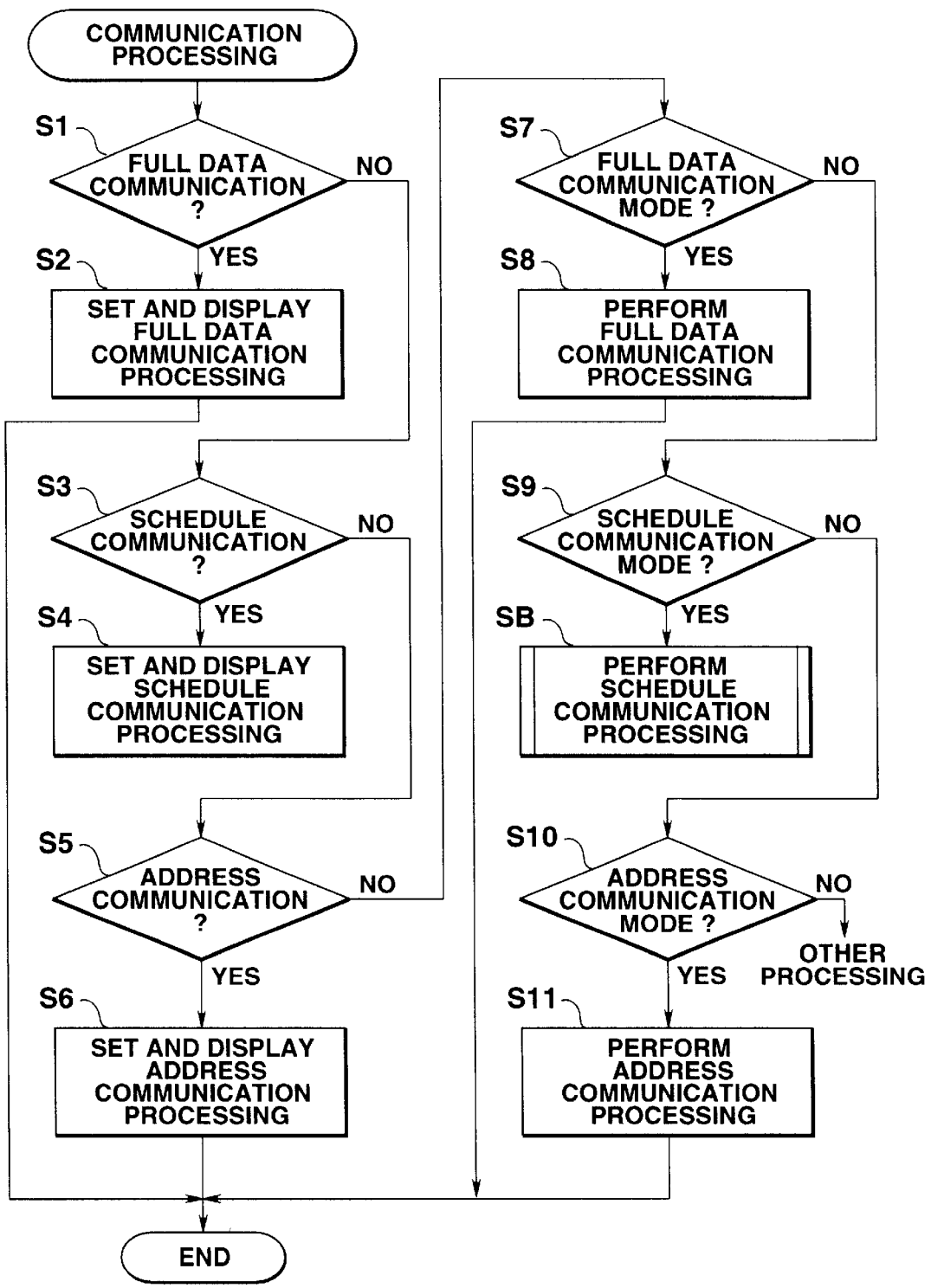
FIG. 8 is a flow chart showing overall processing in the communication processing mode of the personal computer shown in FIG. 1.

FIG. 8 is a flow chart showing overall processing in the communication processing mode of the personal computer 6.

FIGS. 9A to 9D are views showing screens displayed when the communication processing mode of the personal computer 6 is switched to a schedule communication mode.

Figure 9B:
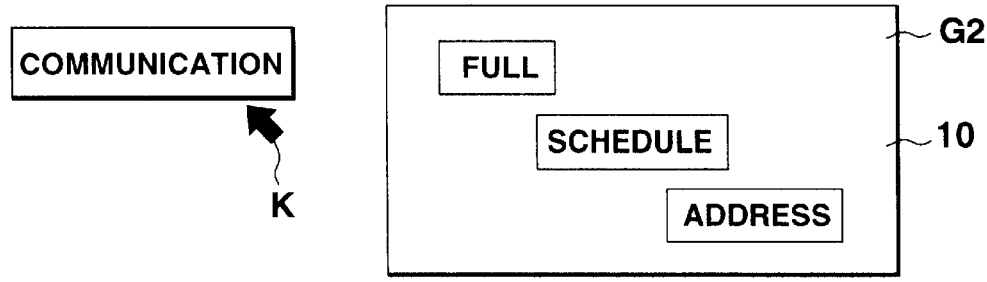

When the mode selection screen G1 is displayed on the CRT display section 10 of the personal computer 6 by clicking the "mode" key, as shown in FIG. 9A, the "communication" key is selected and clicked, as shown in FIG. 9B. Communication processing shown in FIG. 8 is started, and a communication processing mode selection screen G2 is displayed on the CRT display section 10 to select one of the full data communication mode for performing data communication with the watch apparatus 1 for all data including schedule data and address book data, the schedule communication mode for performing data communication with the watch apparatus 1 for only schedule data, and an address communication mode for performing data communication with the watch apparatus 1 for only address book data, and display the selected mode.

On the communication processing mode selection screen G2, when the "full" key is designated by the cursor K and clicked, the full data communication mode set/displayed state is set, and full data communication processing for performing data communication with the watch apparatus 1 for all data including schedule data and address book data is started (steps S1 and S2, and S7 and S8).

On the communication processing mode selection screen G2, when the "address" key is designated by the cursor K and clicked, the address communication mode set/displayed state is set, and address communication processing for performing data communication with the watch apparatus 1 for only address book data is started (steps S5 and S6, and S10 and S11).

Figure 9C:
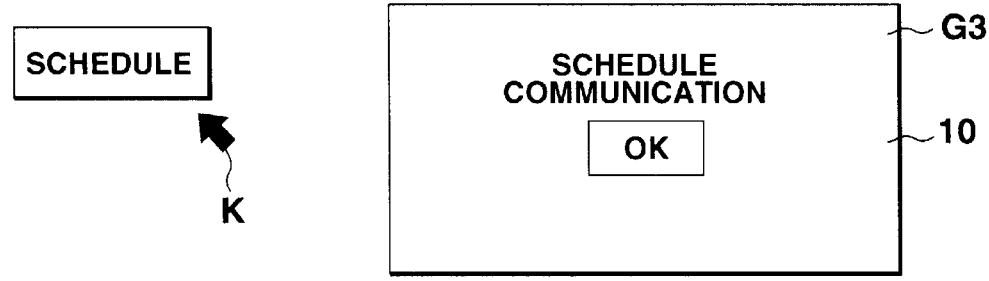

On the communication processing mode selection screen G2, when the "schedule" key is designated by the cursor K and clicked, as shown in FIG. 9C, the schedule communication mode set/displayed state is set, and schedule communication processing for performing data communication with the watch apparatus 1 for only schedule data is started (steps S3 and S4, and S9 and SB). At this time, by communication connection processing between the infrared transceiver 11 of the personal computer 6 and the transceiver section 3 of the watch apparatus 1, schedule data communication preparation processing is performed. When communication is in order, a schedule communication initial screen G3 in which message data "schedule communication" meaning the start of schedule communication processing and an "OK" key for instructing the start of schedule communication processing are combined is displayed on the CRT display section 10.

Figure 10:
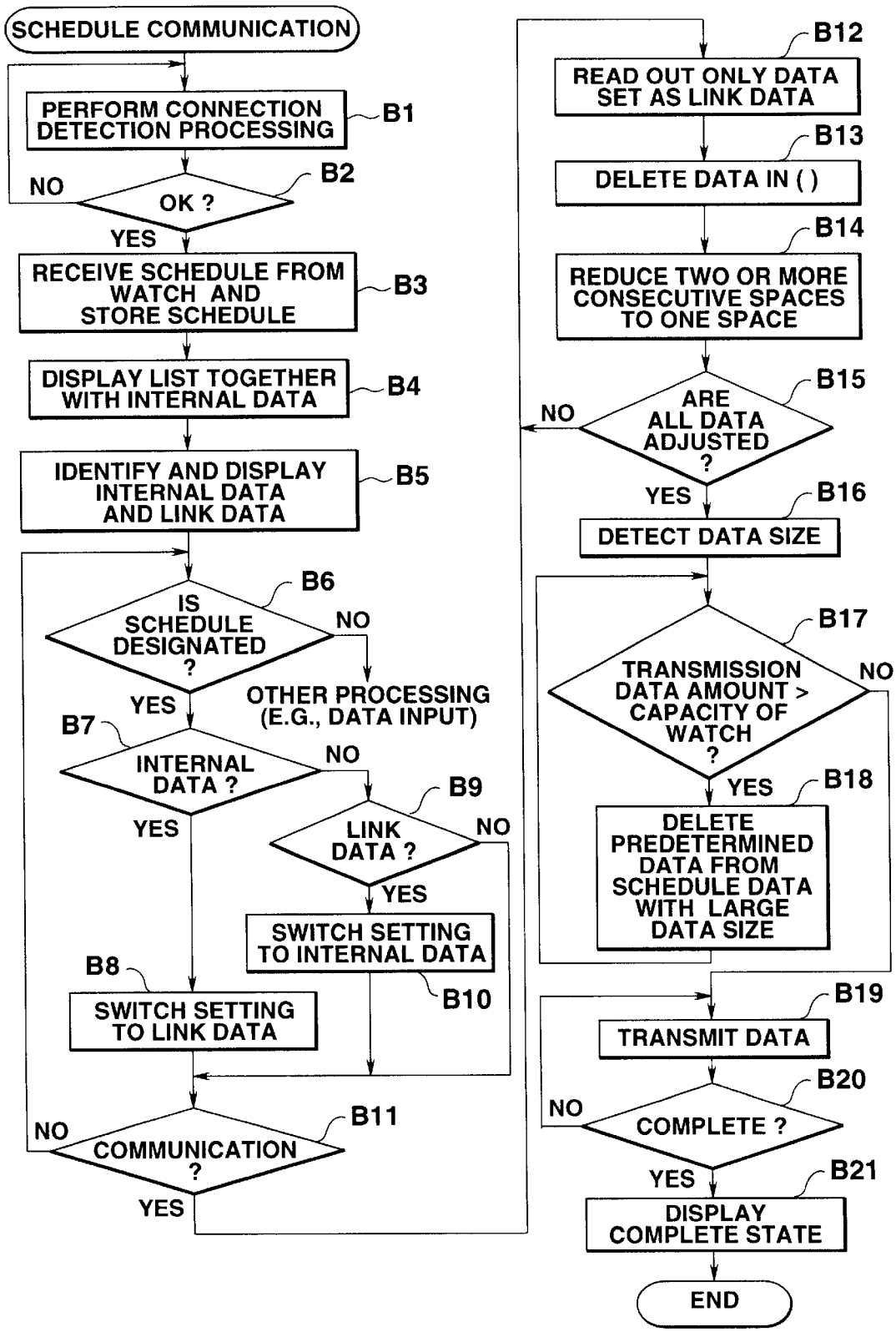
FIG. 10 is a flow chart showing schedule communication processing of the personal computer shown in FIG. 1.

FIG. 10 is a flow chart showing schedule communication processing of the personal computer 6.

Figure 9D:
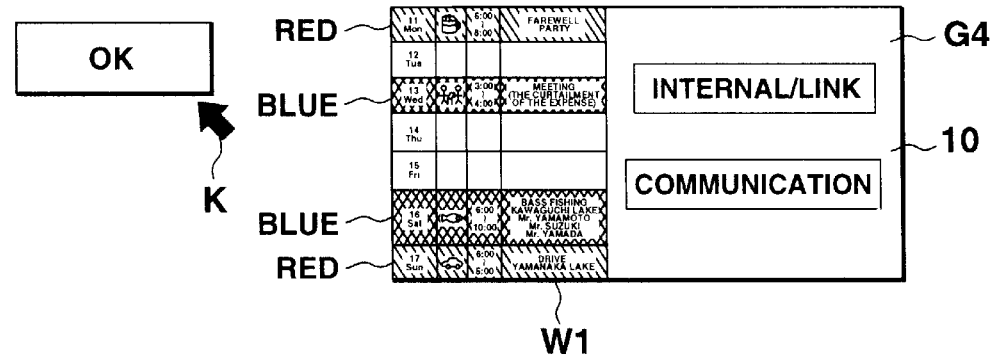

When schedule communication processing of the personal computer 6 is started, preparation for communication connection to the watch apparatus 1 is performed. When preparation for schedule data communication is ended, the schedule communication initial screen G3 is displayed as shown in FIG. 9C. In this state, when the "OK" key is designated by the cursor K and clicked, schedule data stored in the notebook data memory in the RAM 23 of the watch apparatus 1 is transmitted from the transceiver section 3 and received by the infrared transceiver 11 of the personal computer 6. New schedule data is additionally stored and set as link data without changing schedule data already stored in the schedule data memory 34a in the RAM 34. Simultaneously, all schedule data including the new schedule data received from the watch apparatus 1 and stored are read out and displayed on the CRT display section 10 as a schedule communication screen G4 including the schedule list window W1, as shown in FIG. 9D (steps B1, B2, B3, and B4).

On the schedule list window W1 in the schedule communication screen G4, schedule data set in the schedule data memory 34a as internal data is identified and displayed in red, and schedule data set as link data is identified and displayed in blue (step B5).

Figure 11:
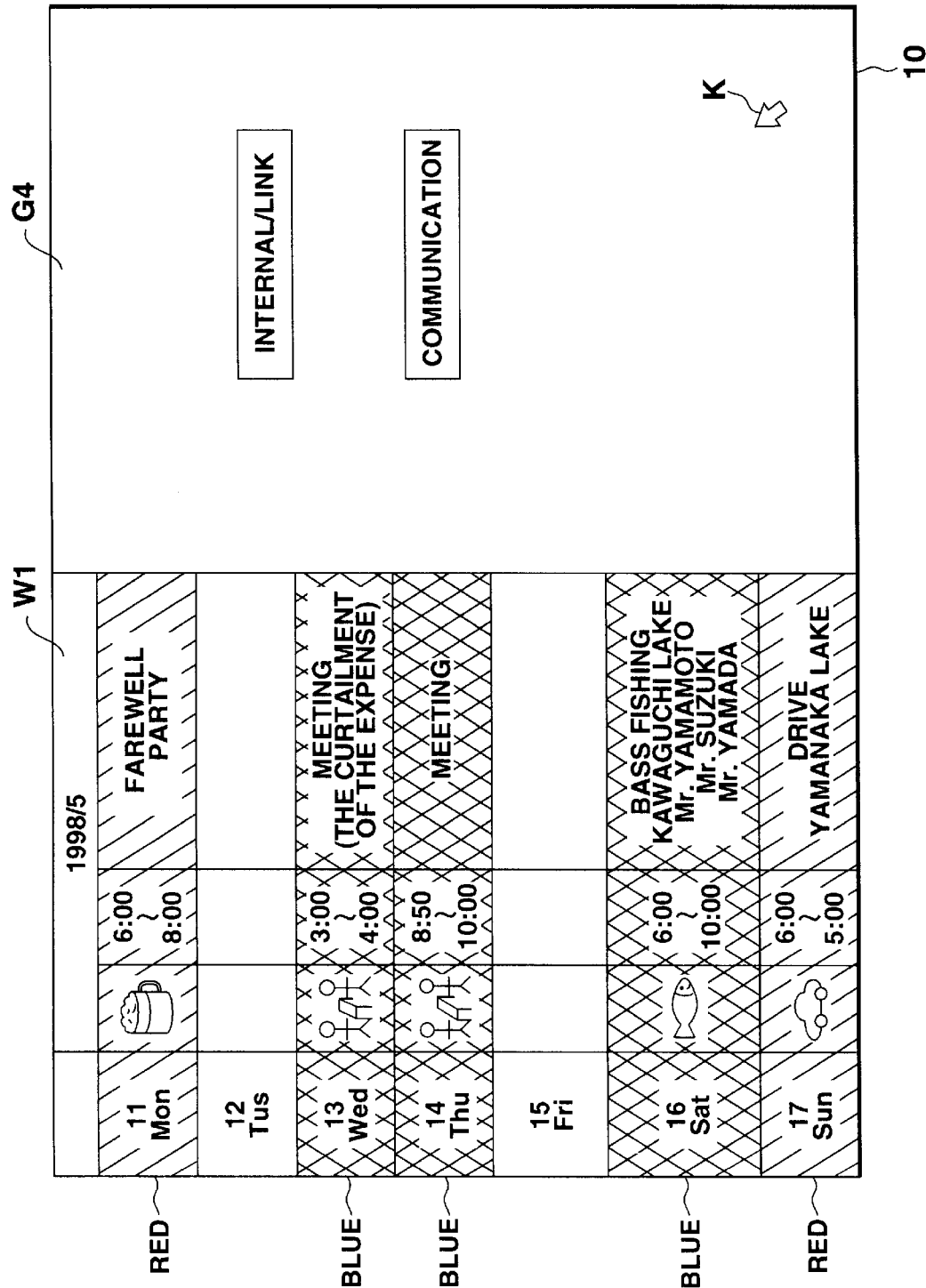
FIG. 11 is a view showing the schedule screen initially displayed in response to data reception from a watch in schedule communication processing of the personal computer shown in FIG. 1.

FIG. 11 is a view showing the schedule communication screen G4 (enlarged view of FIG. 9D) initially displayed in response to data reception from the watch apparatus 1 in schedule communication processing of the personal computer 6.

In this embodiment, schedule data received from the watch apparatus 1 and registered as new link data is schedule data "MEETING" in 1998. 5. 14 (Thu). To store the new schedule data received from the watch apparatus 1 in the schedule data memory 34a, matching with all keywords corresponding to icons stored in the icon data memory 33a in the ROM 33 is detected, and a corresponding icon is set and stored. The icon is also added to the schedule list window W1 and displayed.

On the schedule communication screen G4, an "internal/link" key for selectively switching setting of each schedule data displayed on the schedule list window W1 from internal data to link data or from link data to internal data is simultaneously displayed. A "communication" key for starting schedule data transmission from the personal computer 6 to the watch apparatus 1 after selection and setting the internal data and link data is also displayed.

FIG. 12 is a view showing the schedule communication screen G4 displayed when setting between internal data and link data is changed in schedule communication processing of the personal computer 6.

As shown in FIG. 11, when the new schedule data "MEETING in 1998. 5. 13 (Thu)" received from the watch apparatus 1 is additionally stored and identified and displayed as link data (steps B3 to B5), schedule input processing (FIG. 6) is started. With this processing, the content data of the schedule can be rewritten from simple content data "MEETING" input from the watch apparatus 1 to desired detailed content data "MEETING-BUSINESS REPORT (Mr. YAMADA)" and stored (step B6 to other processing).

When schedule data "DRIVE YAMANAKA LAKE" in 5/17 (Sun) (FIG. 11) which is stored and managed as internal data and identified and displayed in red, as shown in FIG. 12, is pointed by the cursor K and clicked, and the "internal/link" key is pointed and clicked, it is determined that the schedule data is identified and set as internal data in the schedule data memory 34a in the RAM 34, and the data is switched from the internal data to link data and identified and displayed not in red but in blue (steps B6, B7, and B8).

On the other hand, when the "internal/link" key is clicked on the schedule communication screen G4, and it is determined that the designated schedule data is set as link data, the data is switched to internal data and identified and displayed not in blue but in red (steps B6, B9, and B10).

When the schedule data "DRIVE YAMANAKA LAKE" in 5/17 (Sun) is switched from internal data to link data, and identified and displayed, and the "communication" key is pointed and clicked, only schedule data stored in the schedule data memory 34a in the RAM 34 as link data are sequentially read out. More specifically, only four schedule data displayed in blue in FIG. 12 are sequentially read out. Data in parentheses as content data of the schedules are detected and deleted (steps B11, B12, and B13). More specifically, data (THE CURTAILMENT OF THE EXPENSE) in parentheses of schedule "MEETING" in 5/13 (Wed) and data (Mr. YAMADA) in parentheses of schedule "MEETING-BUSINESS REPORT" in 5/14 (Thu) are sequentially deleted.

Simultaneously, the presence/absence of two or more consecutive spaces as content data is detected from schedule data set as link data sequentially read out in step B12. If two or more consecutive spaces are present, the data is shortened to one space (step B14). More specifically, an excessive space in content data "DRIVE YAMANAKA LAKE" in 5/17 (Sun) is deleted to shorten the data to "DRIVE YAMANAKA LAKE".

After this, for each of the schedule data set as link data and sequentially read out from the schedule data memory 34a, parenthetic data deletion processing and space shortening processing are performed. If it is determined that possible reduction/adjustment of the amount of content data has been executed for all readout data, the reduced data size of all schedule data link data to be transmitted is detected. It is determined whether the data size is larger than the memory capacity of the schedule data memory in the notebook data memory ensured in the RAM 23 of the watch apparatus 1, i.e., the data can be transmitted from the personal computer 6 and stored on the watch apparatus 1 side (steps B15, B16, and B17).

If it is determined that the data amount of schedule data set as link data to be transmitted to the watch apparatus 1 is larger than the memory capacity of the schedule data memory of the watch apparatus 1, schedule data having content data with a large data size is searched for, and data of a predetermined number of characters in the content data is deleted (steps B17 and B18). More specifically, from the content data "BASS FISHING KAWAGUCHI LAKE— PARTICIPATOR Mr. YAMAMOTO, Mr. SUZUKI, Mr. YAMADA" of schedule in 5/16 (Sat), data from "PARTICIPATOR" is deleted to reduce the data amount.

If it is still determined that the data amount of the schedule data as link data to be transmitted to the watch apparatus 1 is larger than the memory capacity of the schedule data memory of the watch apparatus 1 even after deletion of predetermined data from schedule data with a large data size, schedule data with a large data size at that time point is searched for again, and processing of deleting predetermined data is repeated (steps B17 and B18).

When it is determined that the data amount of all schedule data set as link data to be transmitted to the watch apparatus 1, which are read out from the schedule data memory 34a in the RAM 34, has been reduced to be smaller than the memory capacity of the schedule data memory of the watch apparatus 1, the schedule data set as link data whose data amount is reduced are sequentially transmitted from the infrared transceiver 11 of the personal computer 6 to the transceiver section 3 of the watch apparatus 1, overwritten in the schedule data memory in the RAM 23 of the watch apparatus 1, and stored (step B19).

When transmission processing of all schedule data set as link data is ended, a transmission completion message is displayed on the CRT display section 10, and the series of schedule communication processing are ended (step B20 and B21).

With this arrangement, while synchronizing the schedule data stored in the schedule data memory 34a of the personal computer 6 with the schedule data stored in the schedule data memory of the watch apparatus 1, each schedule data can be arbitrarily switched between internal data of the personal computer 6 and link data between the personal computer 6 and watch apparatus 1, and only schedule data set as link data can be transmitted to the watch apparatus 1 to rewrite the schedule data memory. Hence, of all schedule data associated with the user, only specific schedule data which is needed to search for and display objective data on the watch apparatus 1 can be selectively transmitted to the watch apparatus 1, stored, and managed.

FIGS. 13A to 13D are views showing screens displayed upon search of schedule data stored before schedule communication processing between the watch apparatus 1 and personal computer 6.

Figure 13A:
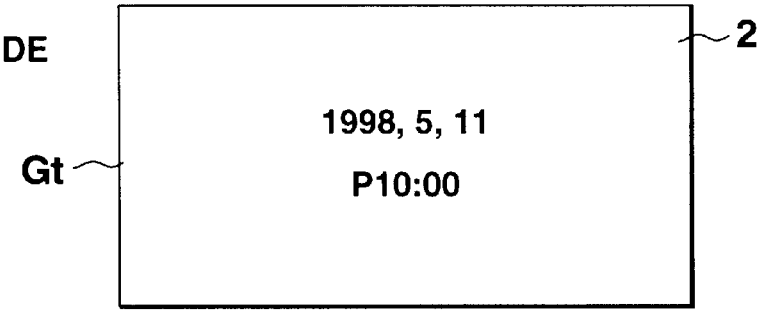
FIGS. 13A to 13D are views showing a screen displayed upon search of schedule data stored before schedule communication processing between the watch and personal computer shown in FIG. 1.
Figure 13B:
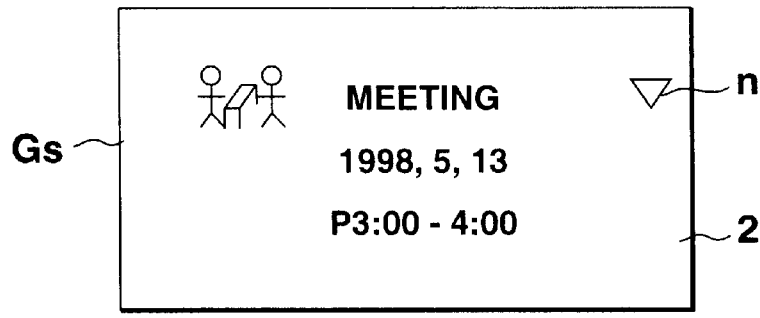

Schedule data stored in the schedule data memory 34a of the personal computer 6 as link data and identified and displayed in blue on the schedule list window W1 are schedule "MEETING" in 5/13 (Wed) and schedule "BASS FISHING" in 5/16 (Sat), as shown in FIGS. 5 and 7. In addition to the two schedule data set as link data, "5. 13" and "MEETING", and "5. 16" and "BASS FISHING", schedule data input in the watch apparatus 1 as single data, "5. 14" and "MEETING", is stored. In this state, as shown in FIG. 13A, a time display mode is set. A time display screen Gt on which "1998. 5. 11, P10:00" is displayed is switched to a schedule display mode to display a schedule display screen Gs, as shown in FIG. 13B. At this time, the date, icon, and contents of schedule data "MEETING" in "5. 13" closest to the current time "1998. 5. 11, P10:00" are read out and displayed on the display section 2.

Since the content data of the schedule input in the personal computer 6, set as link data, and transmitted to the watch apparatus 1 is stored without data in parentheses, "(THE CURTAILMENT OF THE EXPENSE)" in the content data of schedule "MEETING" in "5/13 (Wed)" managed on the personal computer 6 side is not displayed.

On this schedule display screen Gs, a next data mark n representing the presence of the next schedule data is displayed.

Figure 13C:
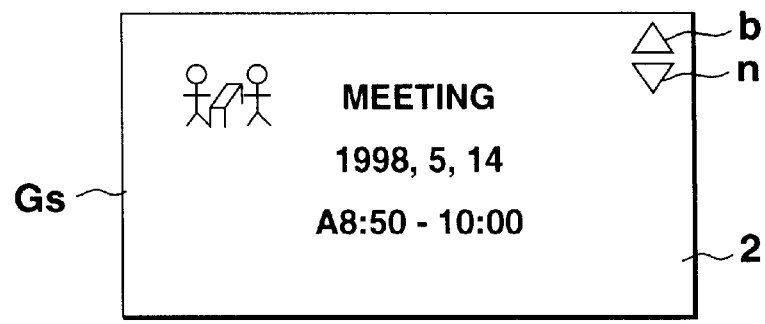

As shown in FIG. 13C, when the next data mark n is pointed by the cursor K and clicked, the date, icon, and contents of schedule data "MEETING" in "5. 14" stored as the next schedule are read out and displayed on the display section 2 as the schedule display screen Gs.

In this case, on the schedule display screen Gs, a previous data mark b representing the presence of previous schedule data is displayed together with the next data mark n representing the presence of next schedule data.

Figure 13D:
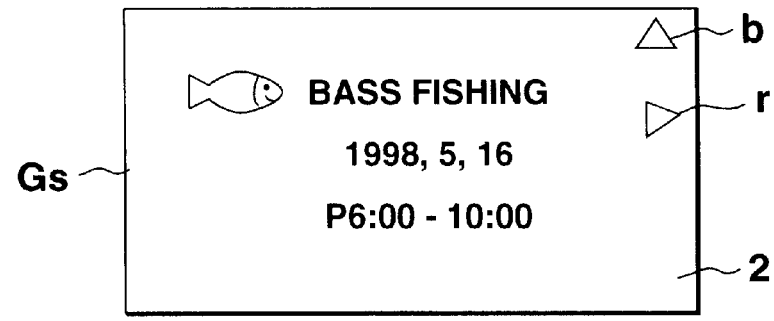

As shown in FIG. 13D, when the next data mark n is pointed by the cursor K and clicked, the date, icon, and contents of schedule data "BASS FISHING" in "5. 16" stored as the next schedule are read out and displayed on the display section 2 as the schedule display screen Gs.

In this case, since no next schedule data is present, the next data mark n is not displayed, and the previous data mark b representing the presence of only previous schedule data is displayed. Since data "KAWAGUCHI . . . " that cannot be simultaneously displayed on the display section 2 of the watch apparatus 1 is present in the content data "BASS FISHING KAWAGUCHI . . . ", a scroll mark r representing that the content data continues is displayed on the schedule display screen Gs on which schedule data "BASS FISHING" in "5. 16" is displayed. When the scroll mark r is pointed and clicked, the content data scrolls to display the continuation.

FIGS. 14A to 14E are views showing screens displayed upon search of schedule data stored after schedule communication processing between the watch apparatus 1 and personal computer 6.

Figure 14A:
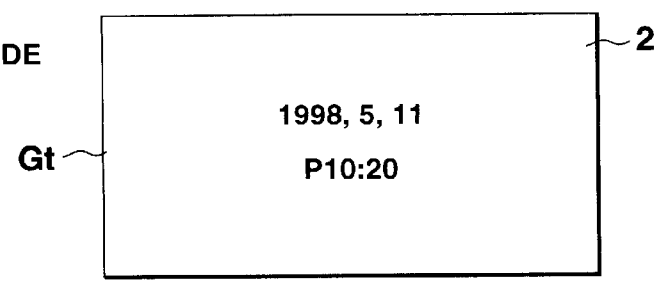
FIGS. 14A to 14E are views showing a screen displayed upon search of schedule data stored after schedule communication processing between the watch and personal computer shown in FIG. 1.
Figure 14B:
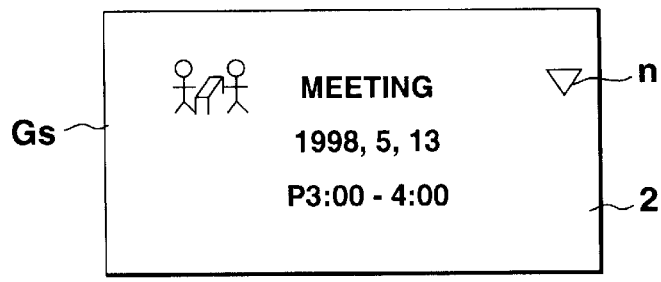

Schedule data stored in the schedule data memory 34a of the personal computer 6 as link data and identified and displayed in blue on the schedule list window W1 are schedule "MEETING" in 5/13 (Wed), schedule "MEETING" in 5/14 (Thu), schedule "BASS FISHING" IN 5/16 (Sat) and schedule "DRIVE" in 5/17 (Sun), as shown in FIG. 12. The four schedule data set as link data are transmitted and stored in the schedule data memory of the watch apparatus 1 after the data amount is reduced by parenthetic data deletion processing (step B13), space shortening processing (step B14), and predetermined data deletion processing (step B18). In this state, as shown in FIG. 14A, the time display mode is set. The time display screen Gt on which "1998. 5. 11, P10:20" is displayed is switched to the schedule display mode to display the schedule display screen Gs, as shown in FIG. 14B. First, the date, icon, and contents of schedule data "MEETING" in "5. 13" closest to the current time "1998. 5. 11, P10:20" are read out and displayed on the display section 2.

Since the content data of the schedule input in the personal computer 6, set as link data, and transmitted to the watch apparatus 1 is stored without data in parentheses, "(THE CURTAILMENT OF THE EXPENSE)" in the content data of schedule "MEETING" in "5/13 (Wed)" managed on the personal computer 6 side is not displayed.

The next data mark n representing the presence of the next schedule data is displayed on the schedule display screen Gs.

Figure 14C:
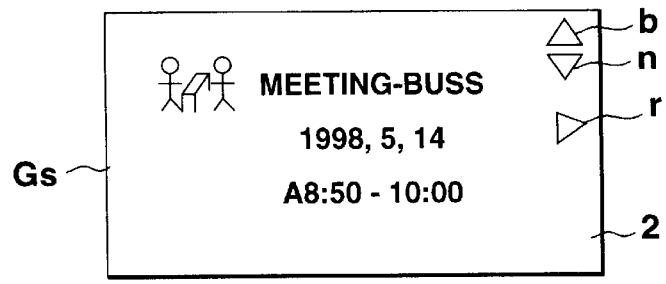

As shown in FIG. 14C, when the next data mark n is pointed by the cursor K and clicked, the date, icon, and contents of schedule data "MEETING-BUSINESS REPORT" in 5/14 (Thu) stored as the next schedule are read out and displayed on the display section 2 as the schedule display screen Gs.

Since the content data of the schedule input in the personal computer 6, set as link data, and transmitted to the watch apparatus 1 is stored without data in parentheses, "(YAMADA)" in the content data of schedule "MEETING-BUSINESS REPORT" in "5/14 (Thu)"managed on the personal computer 6 side is not displayed.

The previous data mark b representing the presence of previous schedule data is displayed on the schedule display screen Gs together with the next data mark n representing the presence of the next schedule data.

Figure 14D:
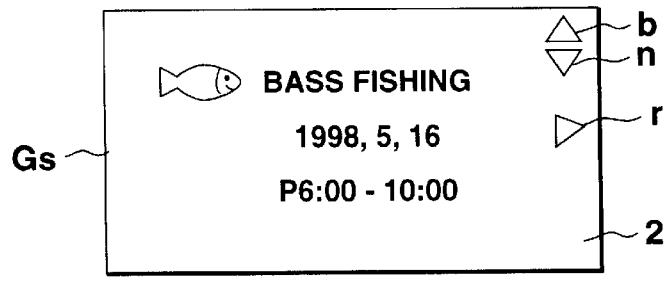

As shown in FIG. 14D, when the next data mark a is pointed by the cursor K and clicked, the date, icon, and contents of schedule data "BASS FISHING" in 5/16 (Sat) stored as the next schedule are read out and displayed on the display section 2 as the schedule display screen Gs.

In this case, predetermined data of the content data of schedule "BASS FISHING" is deleted before transmission from the personal computer 6 to the watch apparatus 1 because of the short in memory capacity on the watch apparatus 1 side. For this reason, data from "KAWAGUCHI LAKE", which is present in the content data of schedule "BASS FISHING" in 5/16 (Sat) managed on the personal computer 6 side, is not present, so the scroll mark r representing that the content data continues is not displayed.

The previous data mark b representing the presence of previous schedule data is displayed on the schedule display screen Gs together with the next data mark n representing the presence of the next schedule data.

Figure 14E:
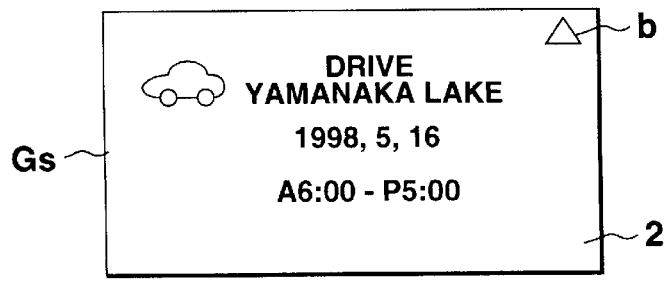

As shown in FIG. 14E, when the next data mark n is pointed by the cursor K and clicked, the date, icon, and contents of schedule data "DRIVE" in 5/17 (Sun) stored as the next schedule are read out and displayed on the display section 2 as the schedule display screen Gs.

If the content data of the schedule input in the personal computer 6, set as link data, and transmitted to the watch apparatus 1 contains two spaces, the spaces are reduced to one space. Although the content data, "DRIVE YAMANAKA LAKE", displayed on the schedule list window W1 on the personal computer 6 side has two spaces inserted, the content data is displayed on the schedule display screen Gs of the watch apparatus 1 as "DRIVE YAMANAKA LAKE" with only one space inserted.

Since no next schedule data is present, the next data mark n is not displayed on the schedule display screen Gs. Only the previous data mark b representing the presence of only previous schedule data is displayed.

According to the data communication system formed by combining the watch apparatus having the display control apparatus with the above arrangement and the personal computer, when arbitrary schedule data is input on the schedule input screen G in schedule input processing in the personal computer 6 while designating a date on the schedule list window W1, matching between the character string data of the input schedule content and each of keywords stored in the icon data memory 33a in correspondence with various icons is detected. A corresponding icon is stored in the schedule data memory 34a in the RAM 34 and managed together with the schedule data. When the schedule data is searched and displayed, the icon is also displayed. Hence, when schedule data are searched and displayed, the contents of each schedule data can be easily recognized at a glance.

According to the watch apparatus having the display control apparatus with the above arrangement and the personal computer, when character string data matching a keyword stored in the icon data memory 33a is detected from the content data of an input schedule, the content data in the range matching the keyword is not stored as character code data but replaced with code data of the corresponding icon and stored in the schedule data memory 34a in the RAM 34. Hence, the data amount of schedule data to be stored can be suppressed.

According to the watch apparatus having the display control apparatus with the above arrangement and the personal computer, schedule data stored and managed in the personal computer 6 as single data and schedule data commonly stored and managed in both the personal computer 6 and watch apparatus 1 are arbitrarily set as internal data and link data, and identified and displayed in different colors on the schedule list window W1. In addition, when schedule data stored in the personal computer 6 are to be transmitted to the watch apparatus 1 and stored, only schedule data set as link data are transmitted and stored. For this reason, schedule data which need be stored in both the personal computer 6 and watch apparatus 1 and schedule data which need not be stored in both apparatuses can be easily identified and managed.

According to the watch apparatus having the display control apparatus with the above arrangement and the personal computer, when schedule data stored in the personal computer 6 and set as link data is to be transmitted to the watch apparatus 1 and stored, data except a predetermined main portion is deleted in units of schedule data to reduce the data amount, and then, the schedule data are transmitted to the watch apparatus 1 and stored. Schedule data having a large data size on the personal computer 6 side can also be managed by storing necessary schedule contents in the schedule data memory of the watch apparatus 1, which has a small storage capacity.

In the above embodiment, schedule input processing and schedule communication processing on the personal computer 6 side have been mainly described. The watch apparatus 1 may also have similar schedule input and communication functions.

In the above embodiment, the icon data memory 33a prepared to add a corresponding icon to schedule data input by schedule input processing is stored in the ROM 33 in advance. However, the icon data memory 33a may also be prepared in the RAM 34 to appropriately set an arbitrary keyword or icon data.

In the above embodiment, data stored and managed by adding icon data by keyword search has been described as schedule data. However, normal memory data, telephone directory data, or address book data may also be stored and managed by adding icon data associated with the data.

Each method described in the above embodiment, i.e., schedule input processing shown in the flow chart of FIG. 6 or schedule communication processing shown in the flow charts of FIGS. 8 and 10 can be stored in an external recording medium such as a memory card (ROM card or RAM card), a magnetic disk (floppy disk or hard disk), an optical disk (CD-ROM or DVD), or a semiconductor memory as a program that can be executed by a computer, and distributed. The computer loads the program recorded in the external recording medium by a recording medium read section (e.g., the floppy disk device 36 of the personal computer 6 or the transceiver section 3 of the watch apparatus 1). When the operation is controlled by the loaded program, the schedule input and communication functions described in the above embodiment are realized, and the same processing as that by the above-described method can be executed.

In the above embodiment, the watch apparatus 1 is used as one information device, and the personal computer 6 is used as the other information device. However, both information devices may be constructed as watch apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus for displaying data together with an icon representing contents of the data, comprising:
   a data input section for inputting data;
   an icon data storage section which stores a plurality of icon data and a plurality of keywords respectively corresponding to the icon data;
   a keyword detection section which detects matching between the data input by said data input section and at least one of the keywords stored in said icon data storage section;
   an icon addition section which automatically identifies at least one of the icon data corresponding to the at least one keyword which is detected to match the data input by said data input section; and
   a display control section which controls the data input by said input section to be displayed along with the icon data automatically identified by said icon addition section.

2. An apparatus according to claim 1, further comprising a data storage control section which replaces a portion of the data input by said data input section that matches the at least one keyword with the icon data automatically identified by said icon addition section, and which then stores the modified data.

3. An apparatus according to claim 1, further comprising a transmission section which transmits to an external device the data input by said input section along with the icon data automatically identified by said icon addition section.

4. An apparatus according to claim 3, further comprising a data storage section which stores the data input by said input section along with the icon data automatically identified by said icon addition section as a data item, and an internal/link setting section which sets the data item stored in said data storage section as internal data to be stored in only said apparatus or as link data to be commonly stored in said apparatus and said external device,
   wherein said display control section includes means for controlling the data item stored in said data storage section to be displayed along with an identification of whether the data item is internal data or link data, and
   wherein said transmission section includes means for transmitting only data items set as link data to said external device.

5. An apparatus according to claim 4, wherein said transmission section includes means for deleting predetermined partial data from the data item stored in said data storage section and for transmitting the remaining data to said external device.

6. A display control method of displaying data together with an icon representing contents of the data,
   comprising:
   inputting data;
   detecting matching between the input data and at least one of a plurality of keywords which have been respectively stored in correspondence with a plurality of icon data;
   automatically identifying at least one of the icon data corresponding to the at least one keyword which is detected to match the input data; and
   controlling the input data to be displayed along with the automatically identified icon data.

7. A method according to claim 6, further comprising:
   replacing a portion of the input data that matches the at least one keyword with the automatically identified icon data, and
   controlling the modified data to be stored.

8. A method according to claim 6, further comprising:
   transmitting the input data along with the automatically identified icon data to an external device.

9. A method according to claim 8, further comprising:
   controlling the input data to be stored along with the automatically identified icon data as a data item; and
   setting the stored data item as internal data to be stored in only an apparatus or as link data to be commonly stored in said apparatus and said external device,
   wherein the stored data item is controlled to be displayed along with an identification of whether the data item is internal data or link data, and
   wherein only data items set as link data are transmitted to said external device.

10. A method according to claim 9, wherein predetermined partial data is deleted from the stored data item and the remaining data is transmitted to said external device.

11. A recording medium on which a computer-readable display control program for displaying input data is recorded,
   said computer-readable program comprising:
   program code means for inputting data;
   program code means for detecting matching between the input data and at least one of a plurality of keywords which have been respectively stored in correspondence with a plurality of icon data;
   program code means for automatically identifying at least one of the icon data corresponding to the at least one keyword which is detected to match the input data; and program code means for controlling the input data to be displayed along with the automatically identified icon data.

12. A medium according to claim 11, wherein said program further comprises program code means for replacing a portion of the input data that matches the at least one keyword with the automatically identified icon data, and for controlling the modified data to be stored.

13. A medium according to claim 11, wherein said program further comprises program code means for transmitting the input data along with the automatically identified icon data to an external device.

14. A medium according to claim 11, wherein said program further comprises:

program code means for controlling the input data to be stored along with the automatically identified icon data as a data item;

program code means for setting the stored data item as internal data to be stored in only an apparatus or as link data to be commonly stored in said apparatus and said external device, program code means for controlling the stored data item to be displayed along with an identification of whether the data item is internal data or link data, and program code means for transmitting to said external device only data items set as link data.

15. A medium according to claim 14, wherein said program further comprises program code means for deleting predetermined partial data from the stored data item and the remaining data is transmitted to said external device.

16. An apparatus for displaying data together with an icon representing contents of the data, comprising:

a data input section for inputting data;

an icon data storage section which stores a plurality of icon data and keywords respectively corresponding to the icon data;

a keyword detection section which detects matching between the data input by said data input section and a keyword stored in said icon data storage section;

a display control section which adds, to the input data, icon data stored in said icon data storage section in correspondence with a keyword which is detected by said keyword detection section to match the data input by said data input section, and for displaying the input data along with the added icon data;

a transmission section which transmits the input data along with the added icon data to an external device; and a data storage section which stores a plurality of input data along with respective added icon data, and an internal/link setting section which sets each of the plurality of data stored in said data storage section as internal data to be stored in only said apparatus or as link data to be commonly stored in said apparatus and said external device, and wherein said display control section includes means for identifying and displaying the data stored in said data storage section as being either internal data or link data as set by said internal/link setting section, and wherein said transmission section includes means for transmitting only data set as link data by said internal/link setting section to said external device, among the plurality of input data added with icon data and stored in said data storage section.

17. A display control method of displaying data with an icon representing contents of the data, comprising:

a data input step of inputting data;

a keyword detection step of detecting matching between the data input in the data input step and a keyword stored in icon data storage means for storing a plurality of icon data and keywords respectively corresponding to the icon data;

a display control step of adding, to the input data, icon data stored in said icon data storage means in correspondence with a keyword which is detected in the keyword detection step to match the data input in the data input step, and of displaying the input data along with the added icon data;

a transmission step of transmitting the input data along with the added icon data to an external device; and an internal/link setting step of setting each of a plurality of input data along with respective added icon data that are stored in data storage means as internal to be data stored in only an apparatus or as link data to be commonly stored in said apparatus and said external device, and wherein the display control step comprises identifying and displaying the data stored in said data storage means as being either internal data or link data as set in the internal/link setting step, and wherein the transmission step comprises transmitting only data set as link data in the internal/link setting step to said external device, among the plurality of input data added with icon data and stored in said data storage means.

18. A recording medium in which a computer-readable display control program for displaying input data is recorded, said computer-readable program comprising:

program code means for inputting data;

program code means for detecting matching between the input data and a keyword stored in icon data storage means for storing a plurality of icon data and keywords respectively corresponding to the icon data;

program code means for adding, to the input data, icon data stored in said icon data storage means in correspondence with a keyword which is detected to match, and for displaying the input data along with the added icon data;

program code means for setting each of a plurality of input data along with respective added icon data that are stored in data storage means as internal data to be stored in only an apparatus or as link data to be commonly stored in said apparatus and said external device;

program code means for identifying and displaying the data stored in said data storage means as being either internal data or link data, and program code means for transmitting only data set as link data to said external device, among the plurality of input data added with icon data and stored in said data storage means.

* * * * *